(12) United States Patent
Nauen

(10) Patent No.: US 12,130,386 B2
(45) Date of Patent: Oct. 29, 2024

(54) DISTANCE MEASUREMENT UNIT

(71) Applicant: OSRAM Beteiligungsverwaltung GmbH, Grünwald (DE)

(72) Inventor: Andre Nauen, Regensburg (DE)

(73) Assignee: OSRAM Beteiligungsverwaltung GmbH, Grünwald (DE)

(*) Notice: Subject to any disclaimer, the term of this patent is extended or adjusted under 35 U.S.C. 154(b) by 156 days.

(21) Appl. No.: 16/762,196

(22) PCT Filed: Oct. 31, 2018

(86) PCT No.: PCT/EP2018/079800
§ 371 (c)(1),
(2) Date: May 7, 2020

(87) PCT Pub. No.: WO2019/096584
PCT Pub. Date: May 23, 2019

(65) Prior Publication Data
US 2020/0386861 A1 Dec. 10, 2020

(30) Foreign Application Priority Data

Nov. 15, 2017 (DE) ...................... 10 2017 220 397.8

(51) Int. Cl.
*G01S 7/484* (2006.01)
*G01S 7/481* (2006.01)
(Continued)

(52) U.S. Cl.
CPC ............ *G01S 7/484* (2013.01); *G01S 7/4817* (2013.01); *G01S 7/4863* (2013.01);
(Continued)

(58) Field of Classification Search
CPC ........ G01S 7/484; G01S 17/10; G01S 7/4868; G01S 7/4863; G01S 7/4817;
(Continued)

(56) References Cited

U.S. PATENT DOCUMENTS

| | | | |
|---|---|---|---|
| 6,061,644 A * | 5/2000 | Leis | ........................ G01S 5/163 382/103 |
| 7,544,945 B2 | 6/2009 | Tan et al. | |

(Continued)

FOREIGN PATENT DOCUMENTS

| | | |
|---|---|---|
| DE | 102007004609 A1 | 8/2007 |
| DE | 102011011875 B3 | 7/2012 |

(Continued)

OTHER PUBLICATIONS

"Summed-area table," Wikipedia, 2016, downloaded Oct. 3, 2023 forom https://en.wikipedia.org/w/index.php?title=Summed-area_table&oldid=726337475, 2 pages. (Year: 2016).*

*Primary Examiner* — Daniel L Murphy
(74) *Attorney, Agent, or Firm* — Slater Matsil, LLP

(57) ABSTRACT

A distance measurement performing a signal propagation time-based measurement of a distance from an object located in a sensing field, the unit including an emitter unit having a plurality of emitters for emitting pulses and a receiver unit for receiving echo pulses. The distance measurement unit is configured for measurement such that the echo pulses are associated with the different solid angle segments and at least two of the emitters emit pulses into at least some of the solid angle segments.

16 Claims, 3 Drawing Sheets

(51) Int. Cl.
   *G01S 7/486* (2020.01)
   *G01S 7/4863* (2020.01)
   *G01S 17/10* (2020.01)
   *G01S 17/931* (2020.01)

(52) U.S. Cl.
   CPC ............ *G01S 7/4868* (2013.01); *G01S 17/10* (2013.01); *G01S 17/931* (2020.01)

(58) Field of Classification Search
   CPC .... G01S 17/931; G01S 7/4808; G01S 7/4815; G01S 7/4816; G01S 17/86; G01S 17/42
   USPC ......................................................... 356/5.01
   See application file for complete search history.

(56) References Cited

U.S. PATENT DOCUMENTS

| | | | |
|---|---|---|---|
| 7,969,558 B2 * | 6/2011 | Hall | H01S 5/0428 |
| | | | 356/141.5 |
| 9,945,951 B2 | 4/2018 | Tobeta et al. | |
| 10,281,322 B2 * | 5/2019 | Doylend | G01S 7/4813 |
| 2007/0024840 A1 * | 2/2007 | Fetzer | G01S 7/4811 |
| | | | 382/106 |
| 2011/0058167 A1 * | 3/2011 | Knox | G08B 17/125 |
| | | | 356/338 |
| 2016/0274223 A1 | 9/2016 | Imai | |

FOREIGN PATENT DOCUMENTS

| | | | | |
|---|---|---|---|---|
| DE | 102016200067 A1 | 7/2016 | | |
| WO | 2017040066 A1 | 3/2017 | | |
| WO | WO-2018055449 A2 * | 3/2018 | ........... | B60Q 1/0023 |

\* cited by examiner

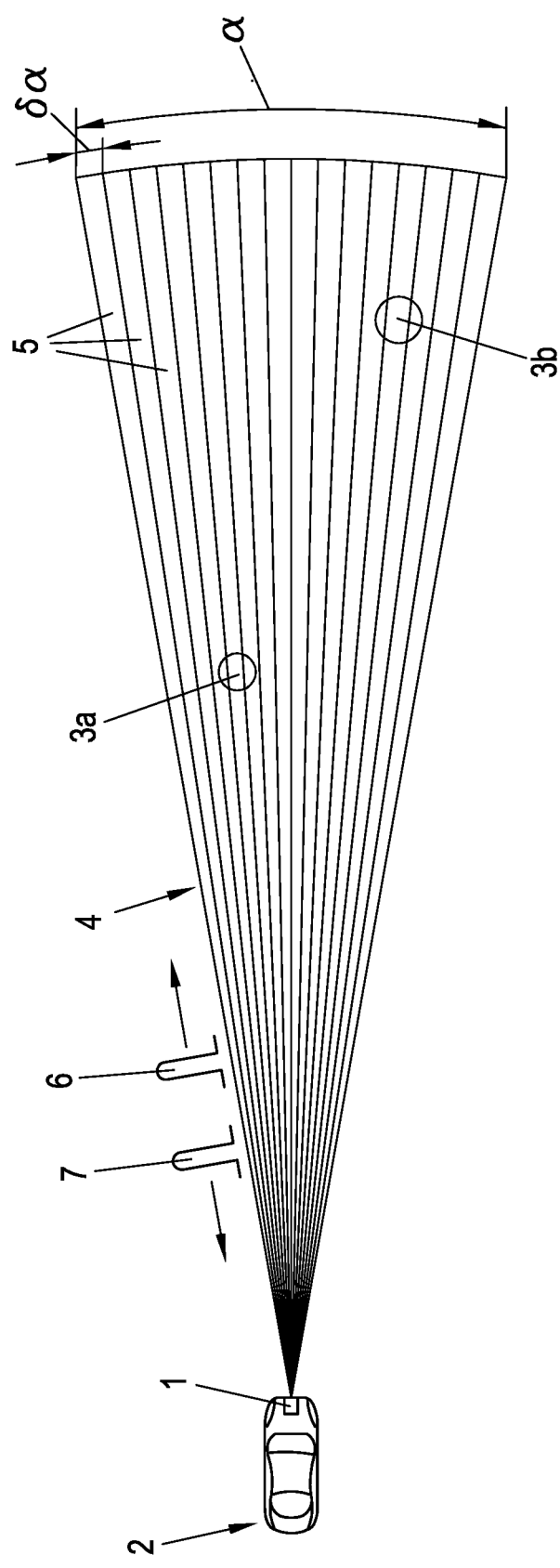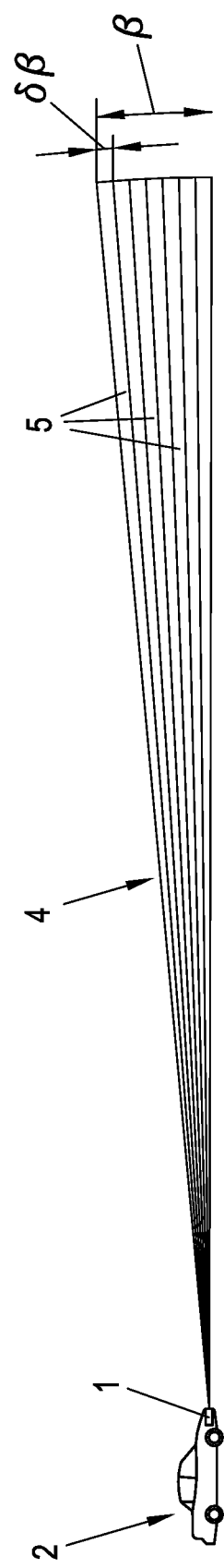
Fig. 1a
Fig. 1b

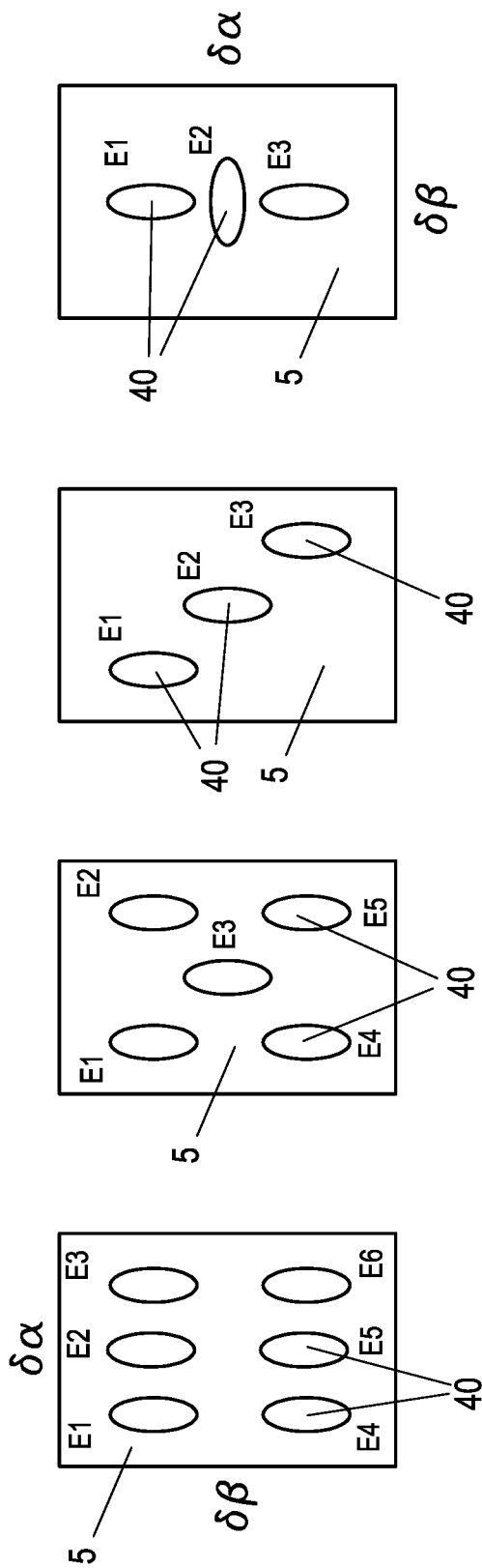
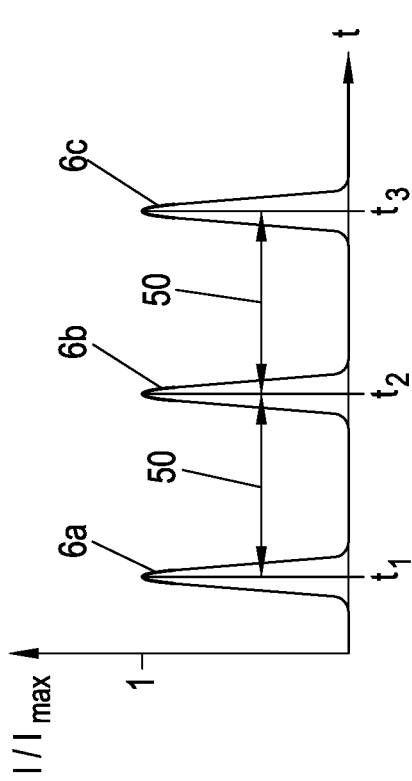

DISTANCE MEASUREMENT UNIT

CROSS-REFERENCE TO RELATED APPLICATIONS

The present application is a National Stage application of, and claims priority, and the benefit of International Application No. PCT/EP2018/079800, filed Oct. 31, 2018, entitled "DISTANCE MEASUREMENT UNIT", which claims priority, and the benefit of German Application No. 10 2017 220 397.8, filed Nov. 15, 2017, entitled "DISTANCE MEASUREMENT UNIT", the entire contents of which are hereby incorporated by reference.

TECHNICAL SUBJECT AREA

The present invention related to a distance measurement unit for signal propagation time-based distance measurement.

PRIOR ART

The distance measurement in question is based on a propagation time measurement of emitted electromagnetic pulses. When these strike an object, a proportion of the pulse is reflected at its surface back to the distance measurement unit and can be recorded as an echo pulse with a suitable sensor. If the pulse is transmitted at a time $t_0$ and the echo pulse is detected at a later time $t_1$, the distance d to the reflective surface of the object can be determined using the propagation time $\Delta t_A = t_1 - t_0$ according to $$d = \Delta t_A c/2 \qquad \text{Eq. 1.}$$

Since these are electromagnetic pulses, c is the value of the speed of light.

DESCRIPTION OF THE INVENTION

The present invention addresses the technical problem of specifying a particularly advantageous distance measurement unit.

This is achieved according to the invention by a distance measurement unit as defined in claim 1. The subject matter is a distance measurement unit, the detection field of which is segmented, i.e. sub-divided, into a plurality of solid angle segments. The distance measurement unit allows the received echo train to be assigned to a solid angle segment; for example, the receiver unit can be solid-angle resolving (the solid angle resolution can also be obtained at the emitter side, however, see below in detail). In the distance measurement unit according to the invention, the emitter unit is equipped with a plurality of emitters to emit the pulses, wherein at least two of the emitters emit into at least some of the solid angle segments.

The division of the solid angle segments specifies a certain resolution or pixel formation on the receiver side, and each solid angle segment can be considered a "receiver pixel". The emitters of the emitter unit are now provided in such a manner that more than one emitter is assigned to the receiver pixels, or at least some of them. In any case, over time (a sequential pulsing is preferred, see below), not only one emitter, but at least one other emitter emits into a respective solid angle segment. In or out of the solid angle segment in question, therefore, echo pulses are received which originate from different emitters, which can help to improve the signal-to-noise ratio (SNR). For this purpose, for example, consecutively received echo pulses can be combined in a process of signal averaging.

Preferred embodiments are found in the dependent claims and the entire disclosure, wherein in the presentation of the features a distinction is not always made specifically between the distance measurement unit and the corresponding operating methods or usages; in any case, the disclosure is to be read implicitly as relating to all categories of claims.

In the context of the dependent claims, the variants "solid-angle resolving receiver unit" and "solid-angle selective operation" will be discussed in detail further. First of all, in relation to the classification: a solid-angle resolving receiver unit can assign echoes that arrive at the same time from different solid angle segments. This can be achieved, for example, by combining a spatially-resolving planar sensor (e.g. a CCD array) with an upstream optical system, which directs incident radiation from the different solid angle segments onto different areas of the spatially-resolving sensor surface.

In the "solid-angle selective operation", on the other hand, the emitter unit is solid-angle selective, thus it allows a selective pulsing into the individual solid angle segments. In a sequential operation, for example, a pulse can be emitted into each of the solid angle segments in sequence, wherein a certain pause period is always placed between the individual segments, in which the receiver unit "listens", in a manner of speaking. In this variant, an integrally measuring receiver unit without spatial resolution can also be provided, such as a simple photodiode. The two variants can also be combined so that, for example, in one direction the detection field is segmented using a solid-angle resolving receiver unit, and in another direction (typically perpendicular to the first) by means of a suitable scanning process (sequential pulsing). The idea of the invention can be implemented with both variants (either as alternatives to each other or in combination).

The detection field, also known as the field of view (FOV), is sub-divided into the solid angle segments, which together therefore fill the entire field of view. In any case, the solid angle segments are largely disjoint to each other; directly adjacent solid angle segments can have an overlap, which can then be measured, for example, at no more than half the width of the respective solid angle segments (resolves no more than half a "pixel"). All solid angle segments are preferably disjoint from each other, wherein there may either be gaps between them or the solid angle segments can also directly adjoin each other. In the case of preferred automotive applications, for example, the detection field may extend horizontally across a wider angular range and/or may be more finely sub-divided than in the vertical direction, but this is generally not mandatory. The detection field can be described, for example, by a horizontal and a vertical 360-degree angle (see the exemplary embodiment for illustration), wherein the segmentation usually involves at least the horizontal angle, preferably also the vertical angle being sub-divided accordingly.

Each of the emitters is designed to emit pulsed electromagnetic radiation. Infrared radiation is preferably used, i.e. wavelengths of at least 600 nm, 650 nm, 700 nm, 750 nm, 800 nm and 850 nm (given in increasing order of preference). For example, around 905 nm may be particularly preferable, in which case advantageous upper limits can be set at no more than 1100 nm, 1050 nm, 1000 nm or 950 nm (given in increasing order of preference). Another preferred value can be at around 1064 nm, which gives advantageous lower limits of at least 850 nm, 900 nm, 950 nm and 1000 nm, and (independently of these) advantageous upper limits of no more than 1600 nm, 1500 nm, 1400 nm, 1300 nm, 1200 nm and 1150 nm (given in increasing order of preference). Preferred value can also be at around 1548 nm or 1550 nm, which gives advantageous lower limits of at least 1350 nm, 1400 nm, 1450 nm and 1500 nm, and (independently of these) advantageous upper limits of no more than 2000 nm, 1900 nm, 1800 nm, 1700 nm, 1650 nm and 1600 nm (given in increasing order of preference). In general, however, wavelengths in the far IR are also possible, e.g. at 5600 nm or 8100 nm.

Where a specific operation is described, this means that in relation to the distance measurement unit itself, its control unit is configured accordingly. Although in general an analog implementation also appears feasible, the control unit will in general comprise a suitably programmed digital unit. This can then control drivers to operate the radiation sources. Optionally, the control unit can also be integrated further, i.e. also comprise an evaluation unit that evaluates the echo pulses detected by the sensor unit (but this is not mandatory; the evaluation can also be carried out, for example, with a separate computer unit, such as the on-board computer in the case of the motor vehicle, or via a cloud connection).

A pulse is a time-limited quantity which is emitted in order to be detected by a distance measurement sensor after a time delay, in the case of a reflection at the object. A pulse width defined according to the half-maximum width (FWHM) can be, for example, a maximum of 1 ms, preferably even significantly smaller, namely, in increasing order of preference, no greater than 800 µs, 600 µs, 400 µs or 200 µs, or even smaller, namely a maximum of 1000 ns, 900 ns, 800 ns, 700 ns, 600 ns, 500 ns, 400 ns, 300 ns, 200 ns, 100 ns, 80 ns, 60 ns, 40 ns, 30 ns, 25 ns, 20 ns, 15 ns, 10 ns, 5 ns or 2 ns (in increasing order of preference). In principle, a pulse of shortest possible duration can be preferred, but for technical reasons, lower limits may be at least 0.001 ns, 0.01 ns or 0.1 ns, for example.

The emitter unit has a plurality of emitters, i.e. at least two, but generally significantly more, e.g. at least 6, 9, 16, 20, 25, 40, 60, 80, 100, 150, 200, 250, 300, 350, 400, 450 or 500 emitters. For example, possible upper limits (independently of these) can be a maximum 10,000, 8000, 6000, 5000, 4000, 3000, 2000 or 1000 emitters. The emitters each have a separate emission surface for radiation emission. In terms of their design they can in principle always be operated independently of each other, but in the emitter unit they can also be interconnected to form (predefined) groups, for example.

The emitters are preferably laser sources. If the emitters are already integrated at the chip level, for example as a so-called VCSEL array (see below in detail), the emitters can also be combined (in groups) by means of appropriate wiring on the chip, for example. However, an emitter unit of which the emitters can be operated completely independently of one another is preferred, wherein any combination provided is achieved by means of an appropriate activation in operation.

In a preferred embodiment, the receiver unit is solid-angle resolving. In contrast to an integral measurement (angle-selective operation), in which the assignment of the echo pulses results from the scanning, the solid-angle resolving receiver unit can also assign echo pulses incident from different solid angle segments at the same time (simultaneously). In general, this could also be realized, for example, with a plurality of separate receivers, which can be tilted relative to each other, each in one of the solid angle segments. For example, a separate photodiode could be provided for each solid angle segment, for example in conjunction with a respective convergent lens, which creates a unique assignment to the respective solid angle segment (the convergent lens can image the sensor surface of the photodiode at infinity, and thus directs the radiation in the solid angle segment onto the sensor surface in the opposite direction).

In a preferred design, the solid-angle resolving receiver unit has a planar sensor, preferably a CCD array or CMOS array. If radiation falls on the sensitive sensor surface of the planar sensor, it can be measured in a spatially-resolved manner. Thus, areas of the sensor surface with incident radiation can be distinguished from areas without incident radiation, and as a rule, differences in intensity can also be resolved ("gray levels"). Independently of the specific design of the sensor, a lens is then also provided, which links each of the solid angle segments to its own separate area of the sensor surface. The lens transforms a solid angle distribution (of the solid angle segments) into a spatial distribution on the sensor surface, which in abstract terms corresponds to a Fourier transformation. The lens is preferably provided as a convergent lens, which can also be assembled from a plurality of single lenses (through which the radiation passes in sequence). A preferred arrangement is one in which the convergent lens images the sensor surface at infinity.

In a preferred embodiment, at least one emitter emits into the entire detection field, in fact into all solid angle segments simultaneously. The emitter is thus not moved back and forth, for example, so as to only cover the entire detection field after temporal integration; instead, the emission is wide-angled, such that the one pulse simultaneously covers all solid angle segments. The solid angle resolution or segment assignment is then obtained with the solid-angle resolving receiver unit. For illustration purposes, if an object is located in the left half of the detection field, for example, and another object is in the right half at the same distance, the corresponding echo pulses arrive at the same time, but the solid-angle resolving receiver unit nevertheless allows an assignment to the different solid angle segments.

In a preferred embodiment, while at least one of the emitters emits into multiple solid angle segments at the same time, it does not do so into the entire detection field but only into part of it. For example, in combination with another emitter which can fill the entire detection field (all solid angle segments simultaneously, see above), the emitter covering only one part can then define a segment in the detection field, in which the measurement is or can be performed with an improved signal-to-noise ratio. The specific point where this segment is located in the detection field can also be determined by the application, for example in the case of the motor vehicle application, in the center of the road and/or to the side of the road (for the most accurate resolution of, e.g., pedestrians etc.).

A corresponding segment does not necessarily have to be monitored continuously by a multiple emission from the different emitters, this can be carried out only in a specific "increased SNR" operating mode. If, for example, an object is detected in the segment in question, for example by the distance measurement unit itself or by another sensor system in the case of automotive applications (such as a camera or a radar system), the mode can be switched to "increased SNR". A corresponding switch can even be made dependent on an object classification or detection, so that, for example, measurements with an increased SNR are only carried out in the case of an increased safety level, for example when a pedestrian or cyclist is detected.

In a preferred embodiment, the pulses are emitted into the individual solid angle segments consecutively. In conjunction with an integrally measuring receiver unit this can also provide a solid angle resolution if the echo pulse is "listened for" after each pulse in the sequence (see above, and also in detail below). This variant is also referred to as "scanning". In general, combination with the "angle-resolving receiver unit" is also possible (see also above), but the distance measurement unit can also measure exclusively according to one variant or the other.

Generally, during the scanning of the solid angle segments it is not absolutely necessary to switch to the next solid angle segment after each individual pulse, but a pulse sequence (several pulses in succession) can be output into a respective solid angle segment instead. Generally, in scanning the solid angle segments result from the different spatial directions into which the emission takes place. For example, an angle-selective emission can be implemented by moving the emitter unit appropriately, i.e. by an emitter unit mounted such that it can be tilted or pivoted. For example, an angle-selective emission can also be achieved electro-mechanically by means of a controllable mirror arrangement, such as one or more MEMS mirror systems (Micro Electro Mechanical System, MEMS); the radiation is directed onto the mirror arrangement and arrives at one of the respective solid angle segments depending on the mirror position. However, an electrical-optical conversion may be preferred, in which a spatial distribution of the emitter unit or its emission surfaces is converted by means of a lens into a solid angle distribution (inversely to the principle described above for the planar sensor). The emitters can preferably be laser sources designed as surface emitters, which are grouped in an array pattern in the emitter unit.

Such a surface emitter is also known as a VCSEL (Vertical cavity surface emitting laser), which is referred to as a VCSEL array hereafter. Individual VCSEL laser diodes are currently able to emit in the mWatt range. A variant of the VCSEL laser is a vertical-external cavity-surface-emitting laser (VECSEL), which will be subsumed under the term VCSEL hereafter. VECSEL diodes can already be operated with high pulse powers in the Watt range, so that VECSEL arrays can emit several hundred Watts of radiant power.

Unlike an edge emitter, a surface emitter emits radiation at an angle or perpendicular to the chip plane, and common semiconductor processes can be used to define a comparatively tightly packed array of laser diodes on the chip, which conversely can result in closely staggered solid angle segments and thus a good resolution. The VCSEL array can be designed such that each of the laser diodes can be activated independently of the other sources and thus, in particular, their power can be adjusted in accordance with the main claim (however, in general, some of the laser diodes can be grouped together by the wiring at the chip level).

In a preferred design of the distance measurement unit with an "angle-selective emitter unit", the receiver unit is designed as an integrally (not solid-angle resolving) measuring sensor. For example, it can be a photodiode, such as an APD or SPAD type (Avalanche Photo Diode or Single Photon APD), but also a PIN diode or a photomultiplier. In either case, the sensor has a sensitive sensor surface (the radiation incident thereon, in particular IR radiation, is converted proportionally into an electrical signal), wherein radiation falling on different areas of the sensor surface is not assigned any further (this is the meaning of "integral").

In general, a solid-angle resolving receiver unit could of course be assembled using a plurality of the aforementioned photodiodes or sensors (see above). For this purpose, a plurality of sensors, each of which measures integrally, can be arranged side by side, e.g. in rows or in a matrix pattern. Although each sensor in itself would then only measure integrally, the arrangement nevertheless results in a spatial resolution, which can be converted into a solid angle resolution. Conversely, when a planar sensor is used, in particular a CCD or CMOS array, the solid angle segments do not necessarily need to define its pixelation (spatial resolution), but multiple pixels can also be grouped together to form a solid angle segment (these pixels are then simply evaluated jointly). However, in the case of a planar sensor, exactly one pixel (of its own) is preferably assigned to each solid angle segment, thus conversely, each solid angle segment is defined by exactly one pixel.

The following designs can be implemented with both the angle-resolving reception and when angle-selective emission (scanning) is used.

In a preferred design, in those solid angle segments into which at least two of the emitters emit, the emitter pulses are emitted sequentially for each solid angle segment. This type of operation takes place at least temporarily, thus at least in one of a plurality of operating modes, but is also possible throughout the entire operation. The sequential order in this case refers to those emitters that supply the same solid angle segment together, not necessarily to the solid angle segments among each other.

The at least two emitters can also fill the entire detection field with their respective pulse, for example. At a given time, therefore, emission takes place into all solid angle regions simultaneously, and over time there is then a sequence of such pulses (of the different emitters). Thus at a first point in time, a first emitter emits into all solid angle regions, at a second, subsequent time a second emitter does the same and then, for example, a third emitter, and so on. This can be implemented in an analogous manner if the multiple coverage (at least two emitters per solid angle segment) does not affect the entire detection field, but only a section of it (see above).

The sequential pulsing of the emitters designed for multiple coverage may also be of interest when scanning is used. For example, in a first pass with a first emitter it is possible to switch from solid angle segment to solid angle segment (the first emitter emits into the respective segments), wherein in a second pass another emitter then emits into the individual solid angle segments (again when switching from segment to segment) and then, if appropriate, another emitter, etc. However, it is also possible that in at least some of the solid angle segments a number of pulses are emitted per solid angle segment in direct succession, before switching to a subsequent solid angle segment.

In general, however, simultaneous operation of the at least two emitters is also possible, thus the emitters designed for multiple coverage of a given solid angle segment can also pulse at the same time. By contrast, the sequential approach, whether combined with the raster scanning or pulsing into the entire detection field, is preferred. This is the case because, for example, a control/driver unit may be designed more simply, since in the case of sequential pulsing the maximum current occurring at the system level corresponds only to the maximum current of the single emitter (no summation); multiplexing of a driver circuit is possible for a plurality of emitters. Furthermore, the time lag between the emission of each emitter may also be advantageous in the sense that (purely statistically) the probability of an external interference signal interfering with the measurement decreases (the probability of such an interference signal being present beyond a corresponding period of time and affecting the successive pulses is lower).

In a preferred embodiment, a sequence of the pulses that are due to the different emitters is used to store an encoding. For example, the pulses can carry a specific signature which can help to improve the ability to distinguish external interference signals, in particular the pulses of other distance measurement units. Such an encoding can be stored via amplitude modulation, for example, so that each of the individual pulses, for example, has a different (predefined) amplitude, i.e. maximum power. A spectral coding may be preferred, wherein the emitters differ in the wavelength of the radiation they respectively emit (e.g. in their peak wavelengths). In addition or alternatively, the pulses can also have a different shape, for example, they can differ in a rising and/or falling edge, etc. (e.g. one pulse might have a sawtooth profile with a rising edge and the other a sawtooth profile with a falling edge). An encoding can also be stored, for example, in a modulation of the emission times, wherein the modulation can have a predefined time profile or can also be stochastic.

In a preferred embodiment, a pause duration between two pulses emitted sequentially and directly consecutively by the different emitters to provide multiple coverage of the solid angle segment(s) is no longer than 10 µs, and in order of increasing preference is no more than 8 µs, 6 µs, 4 µs, or 2 µs. Possible lower limits can be at least 0.3 µs, 0.5 µs or 1 µs, for example, and can be determined by the desired range in the detection field. For example, for a range of 300 m, i.e. a signal path of 600 m, the required pause period can be around 2 µs, see Eq. 1. For a range of, for example, 100 m, the required pause duration would be 670 ns.

The 2 µs corresponds to a frequency of 500 kHz, which for comparison would be very difficult to realize, if at all, with an emitter unit with a single emitter, since a duty cycle of an IR laser diode is approximately 10 µs. The switching frequencies of common laser sources or diodes are usually an order of magnitude lower, at around 50 kHz, in particular in view of the temperature regime to be allowed for in automotive applications. This illustrates that with the present approach of "multiple emitters per solid angle segment", depending on the number and clock rate of the emitters, for example for a propagation time of 1 µs, up to a factor of 10 times as many pulses can be accommodated in the respective solid angle segment (for 0.5 µs, for example, up to a factor of 20). As mentioned above, this can firstly help to improve the signal-to-noise ratio, and it can also similarly increase the refresh rate of the measurement data. Changes in the detection field can thus be detected more quickly and with less susceptibility to interference, which can be of interest, in particular, with regard to partially or fully autonomous vehicles. Any disadvantage, namely the increased cost or increased complexity that would result from providing a plurality of emitters, is more than compensated by the advantages mentioned.

In a preferred embodiment, the emitters provided for multiple coverage of the solid angle segment or segments emit with different timing relative to each other in different operating modes. In concrete terms, there is then a first operating mode in which they emit sequentially relative to each other as in the preceding paragraphs, which results in the aforementioned advantages. However, in a second operating mode they emit simultaneously (synchronously), which can be advantageous, for example, if it would otherwise not be possible to receive any signal above the noise threshold at all. For example, with an object which is appropriately far away or is otherwise unfavorable in terms of its surfaces (reflection properties, etc.), the echo pulse can become so small that a suitable signal can no longer be obtained even by means of signal processing (merging multiple successive echo pulses). Switching to the synchronous mode (second mode of operation) can then be an advantage.

On the other hand, in the case of a nearby/highly reflective object the sequential operation can be advantageous, for example, in the sense that it can prevent overdriving of the receiver unit. A dynamic range, which is determined by the expected range of power levels of the echo pulses, can therefore be advantageously limited. The received power can then conversely be resolved, e.g. with finer nuancing (evaluation of the "brightness").

In a preferred design, the distance measurement unit is configured such that at least one of the emitters emits its pulses with different power levels over time, where this preferably applies to at least 30%, 50%, 70% and 90% of the emitters, particularly preferably to all emitters.

The power adjustment, for example, a reduction at lower object distances, can offer advantages, for example, in terms of energy efficiency or thermal economy of the emitter unit, or can also help to reduce a photo-biological hazard, in particular with regard to eye exposure. The terms "distance", "object distance" and "object-related distance" are used synonymously here and in the following. Vehicles that are driven partially or fully autonomously can use a plurality of distance measurement units, which are mounted at different positions of the vehicle and in combination provide a 360-degree field of vision. Distance measurement units based on different technologies can also be used, in particular camera systems in the visible, ultraviolet and infrared spectral ranges, ultrasound- or infrasound-based acoustic distance measurement units, radar-based distance measurement units and LIDAR-based distance measurement units. The different distance measurement units can be designed for different object distances, starting from the centimeter and meter range up to distances of several hundred meters, or even beyond.

In a preferred embodiment, the power is adjusted according to an object classification. For illustration purposes, for example, pedestrians and cyclists can be assigned to a class and the pulses can be emitted with reduced power when the object is assigned to this class, e.g. to reduce a photo-biological hazard or to avoid glare effects etc. Other object classes can include: motorcycles, quad-bikes, traffic signs, cars, trucks, bridges, tunnels, traffic lights, junctions, flying objects. The classification can be part of an object detection process, but the latter is generally not mandatory (for example, it is not absolutely essential to recognize a truck as such, rather it may already be assigned a specific, usually higher power, on the basis of a size criterion).

In the case of the motor vehicle, the data collected with the distance measurement unit can also be supplemented, for example, by additional sensor data, such as camera images of the field of view, etc. This is possible in object classification or recognition, but also in the extrapolation of distance functions by means of motion trajectories, discussed above. On the other hand, classification or recognition may also be possible solely on the basis of the data collected by means of the distance measurement unit.

The object classification/recognition can proceed in the same manner as the methods known from two-dimensional image processing; in simple terms, the solid angle regions define a grid and the respective assigned distance value can be considered as a gray level. The measured distance image is then typically segmented, e.g. using defined thresholds or by edge-based or region-based segmentation. The image can be searched for specific edge or surface information, or for whole templates ("what could the object in question look like after segmentation?"). The object(s) can then be divided into classes, in particular by means of an object database, which preferably feeds into an object recognition process.

In a preferred design, in the solid angle region or regions in which an object classified as a pedestrian/cyclist is located, emission takes place with a reduced power $P_1$. This refers to the comparison to a second power $P_2$, which is applied in the case of the object being assigned to a second class. This applies for equal distances from the object (for example, in the case of a cyclist/pedestrian who is very far away, the power can be the same or greater than in the case of a motor vehicle a short distance away). In addition to motor vehicles as other road users, the second class may also include highway bridges or trees at the edge of the road, etc. For example, if an object is classified as a tree, an increased power $P_3$ can sometimes be applied, because the fragmented surface structure of the leaves or needles is expected to result in a degraded reflection or increased scattering to the sides.

In a preferred embodiment, the power is reduced for an object detected at a shorted distance away. Assuming a first distance $d_1$ and a greater distance $d_2$, a first power $P_1$ at the first distance is chosen to be less than a second power $P_2$ which is applied at the second distance. For example, an interval can be set around each of the distances $d_1$, $d_2$ and the power $P_1$ or $P_2$ is then applied depending on whether the measured or assigned distance value lies in the first or second interval. Other intervals can then also be set, e.g. n intervals, which define a set of n consecutive levels, each with a different power $P_n$.

However, a continuous adjustment is also possible, in other words the power P(d) can be stored as a continuous function of the distance. A polynomial function, such as a second-degree polynomial, possibly with correction terms, is particularly suitable for this purpose. Compared to the step-wise adjustment, the continuous variant can provide even greater accuracy, on the other hand the step-wise adjustment can be less complex and time-consuming, which can be advantageous in the automotive environment (short response times and simpler, robust components).

The invention also relates to a method for operating a distance measurement unit disclosed in the present application, see also the introductory comments. The distance to the object is measured based on a signal propagation time, specifically by means of the pulses or echo pulses emitted by the emitters and then reflected at the object. At least two emitters each emit into at least some of the solid angle segments.

The invention also relates to the use of a distance measurement unit as disclosed in the present application in a motor vehicle, e.g. a truck or a motorcycle, preferably in a passenger car. The invention is particularly preferably applied in a partially or fully autonomous vehicle. In general, however, it can also be applied in an airborne or water-borne vehicle, such as an airplane, helicopter or ship.

A vehicle can have a plurality of distance measurement units according to the invention, wherein the detection field or field of view (FOV) of each of the distance measurement units is preferably spatially disjunct from the other distance measurement units. This allows a larger total solid angle range to be detected (in front, to the side, behind, above the vehicle). If the distance measurement units have different IR laser wavelengths, the fields of view (FOV) may also not be disjunct, i.e. they can at least partially overlap. The distance measurement units can be integrated into existing vehicle headlight systems, for example.

BRIEF DESCRIPTION OF THE DRAWINGS

In the following text, the invention is explained in more detail on the basis of an exemplary embodiment, wherein the individual features contained in the sibling claims can also be essential to the invention in other combinations, and it is still the case that no specific distinction is made between the different categories of claims.

Taken individually, in the drawings

FIG. 1a shows a vehicle with a distance measurement unit and the detection field thereof, which is subdivided into solid angle segments in a plan view (bird's eye view);

FIG. 1b shows the arrangement according to FIG. 1a in a side view;

FIG. 3a shows a first option for assigning a plurality of emitters to one of the solid angle segments in accordance with FIG. 1a,b;

FIG. 3b-d show other possible variants of the arrangement;

FIG. 4 shows a chronological sequence of pulses emitted by different emitters into the same solid angle segment.

PREFERRED EMBODIMENT OF THE INVENTION

Figure 2A:
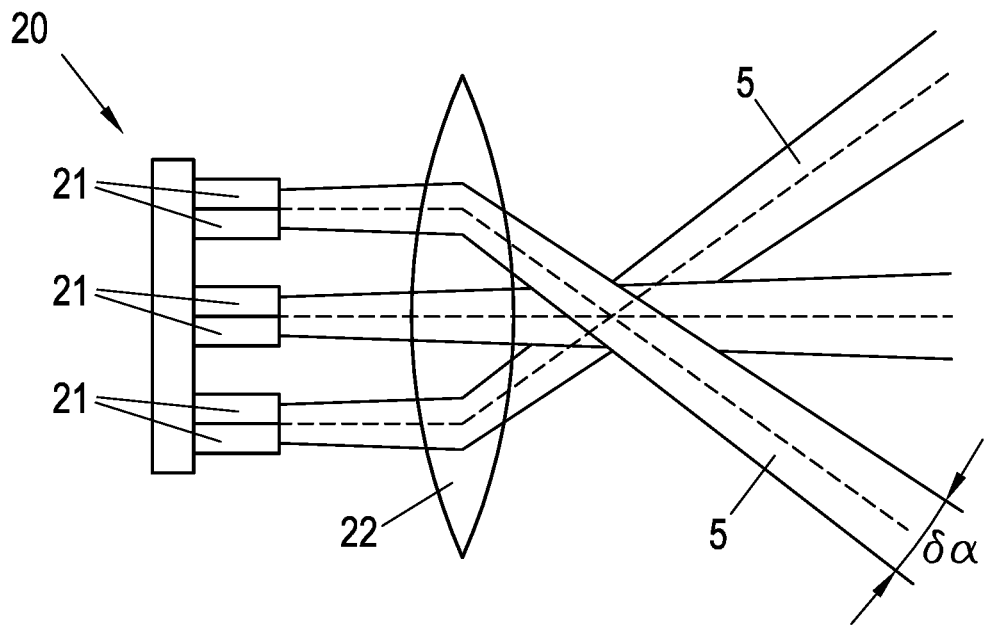
FIG. 2a shows an emitter unit in an optional design as a component of the distance measurement unit in accordance with FIG. 1a,b.

FIGS. 1a,b show a distance measurement unit 1, which is installed in a motor vehicle 2 and is oriented in the direction of travel (forwards). The distance measurement unit can be used to measure the distance to objects 3a,b, such as other vehicles or pedestrians, etc., if these objects 3a,b are located in the detection field 4 of the distance measurement unit 1. The detection field 4, which has a horizontal opening angle $\alpha$ and a vertical opening angle $\beta$, is divided into a plurality of solid angle segments 5, each of which has an opening angle $\delta\alpha$, $\delta\beta$ see also FIG. 2a for illustration.

The distance measurement is resolved according to the solid angle segments 5, thus, for example, object 3a can be distinguished from object 3b as being located in different solid angle segments 5. Depending on the nature (size, surfaces, etc.) and also the distance to the object, it is even possible to differentiate within a particular object 3a,b. For the distance measurement, a pulse 6 is emitted, which, provided an object is located in the respective solid angle segment 5, returns as an echo pulse 7 and is received.

FIG. 2a shows an emitter unit 20 with a plurality of emitters 21. In this schematic diagram, which shows a plan view similarly to FIG. 1, each of the solid angle segments 5 is assigned two emitters 21. The emitters 21 in this case are provided in the form of a VCSEL array, for details of which reference is made to the description introduction. With a lens 22, the infrared radiation emitted by these laser sources is directed into the individual solid angle segments 5.

According to FIG. 2a, two emitters 21 are assigned to each of the solid angle segments 5, but more than two emitters are also possible, see also FIG. 3. Per solid angle segment 5, the emitters 21 can then emit their pulses 6 sequentially, wherein, since they are separate emitters 21, in a sequential operating mode a relatively short clock rate is possible, namely of only around 2 µs. Reference is also made to the comments in the description introduction. Some of the emitters 21 can also be interconnected to form a group and simultaneously emit laser pulses.

The variant according to FIG. 2a shows an angle-selective emitter unit 20, which can therefore selectively emit its pulses 6 into the individual solid angle segments 5. This emitter unit 20 can then be combined, in particular with a receiver unit which does not measure with solid-angle resolution itself, in other words, the incident radiation power is detected integrally on its sensor surface. The detection field 4, i.e. the individual solid angle segments 5, are then pulsed sequentially, wherein after the emission of a respective pulse 6 into a respective solid angle segment 5 and before the emission into the subsequent solid angle segment 5, the system waits for a certain period of time, which is also determined by the range. Figuratively speaking, the distance measurement unit "listens" to see whether an echo pulse 7 returns from the respective solid angle segment 5.

Figure 2B:
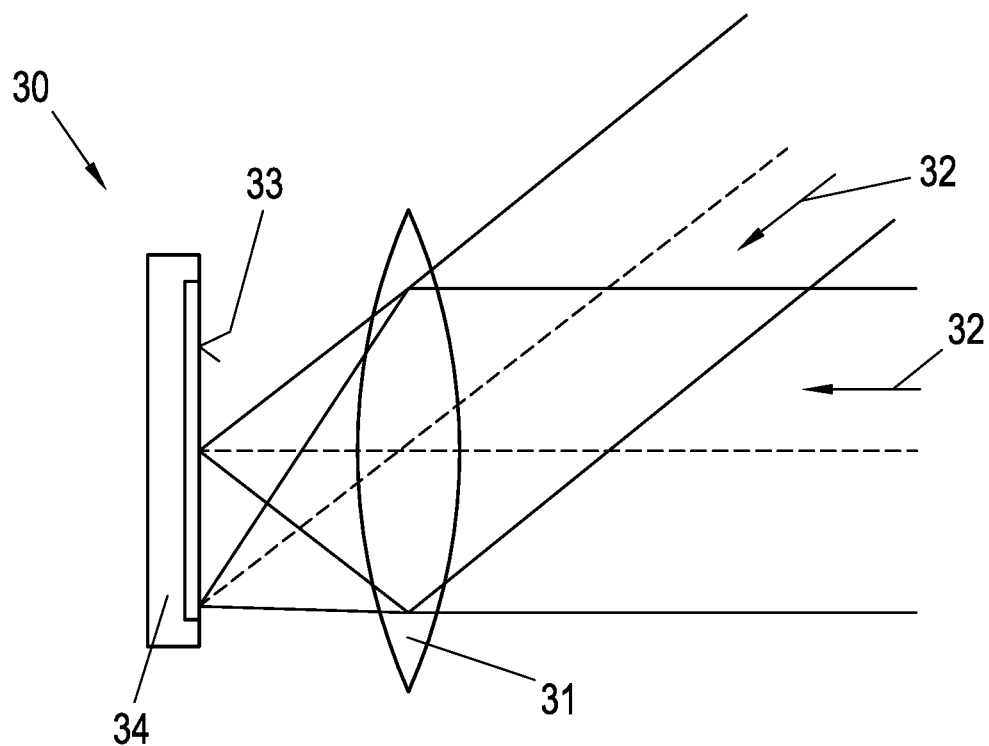
FIG. 2b shows a receiver unit in an optional design, as a component of the distance measurement unit in accordance with FIG. 1a,b.

FIG. 2b shows a receiver unit 30 which is solid-angle resolving. The principle—conversion of spatial and solid-angle distribution—corresponds to that according to FIG. 2a, except that the direction is reversed. The receiver unit 30 has a lens 31, with which incident radiation from different spatial directions 32 is directed onto different regions of a sensitive sensor surface 33 of a planar sensor 34, such as a CCD array. Using the spatial resolution of the planar sensor 34 therefore, an assignment to the spatial directions 32 and thus the individual solid angle segments 5 is possible.

As an illustration, in the case of a CCD or CMOS array, the pixel size of its spatial resolution can be in the range of a few microns (e.g. 1-20 µm), but a coarser resolution is also possible. For example, if a PIN diode or APD matrix is provided, the pixel sizes can extend into the millimeter range. For example, a possible pixel size of a PIN diode can be approximately 0.5×2.5 mm².

With the receiver unit 30, which has a solid-angle resolving design in accordance with FIG. 2b, each respective echo pulse 7 can be assigned to a respective solid angle segment 5. In this case, the segmentation of the detection field 4 can take place on the receiver side, hence the pulses 6 do not necessarily have to be emitted in an angle-selective manner. Instead, the pulses 6 can simultaneously cover all solid angle segments 5, the segmentation results being obtained on the receiver side. However, even in this case, the emitter unit 20 then has a plurality of emitters 21, thus a plurality of emitters 21 is assigned to each of the solid angle segments 5.

FIGS. 3a to d illustrate in a schematic view how multiple emitter pixels 40 are located in a given solid angle segment 5, i.e. a "receiver pixel", due to the assignment of a plurality of emitters 21. The emitter pixels 40 can be placed in rows and columns, for example, (FIG. 3a) or also in a single row, and the multiple assignment can thus exist only in relation to the horizontal direction (FIG. 3d). More complex patterns are also possible, however, and ultimately it is the interaction of the arrangement of the emitters 21, especially in connection with the shape and orientation of their emission surfaces, and the lens 22 that determines the orientation and position of the emitter pixels 40.

FIG. 4 shows a plurality of pulses 6a-c in one of the solid angle segments 5, plotted over time. Each of the pulses 6a-c originates from a separate emitter, the first emitter emits at the time $t_0$, the second at the time $t_1$ and the third at the time $t_2$. Due to the multiple assignment of the solid angle segment 5, i.e. because a plurality of emitters 21 are assigned, a pause period 50 between two directly consecutive pulses 6a,b, 6b,c can be kept comparatively short at only approximately 2 µs.

This means that not only can the signal/noise ratio be improved by averaging over the individual pulses 6a-c, but also that a comparatively high-frequency detection can be implemented, see also the description introduction for details.

LIST OF REFERENCE SIGNS

Distance measurement unit 1
Motor vehicle 2
Objects 3
Detection field 4
Solid angle segment 5
Pulse 6
Echo pulse 7
Emitter unit 20
Emitter 21
Lens (of the emitters) 22
Receiver unit 30
Lens (of the receiver unit) 31
Spatial direction 32
Sensor surface 33
Planar sensor 34
Emitter pixels 40
Pause duration 50

The invention claimed is:

1. A distance measurement unit for signal propagation time-based measurement of a distance from an object located in a detection field segmented into solid angle segments, the distance measurement unit comprising:
an emitter unit with a plurality of emitters each designed to emit pulses in form of electromagnetic radiation; and
a receiver unit configured to receive echo pulses after a distance-dependent propagation time of the electromagnetic radiation,
wherein the distance measurement unit is configured for a measurement such that the echo pulses received from different solid angle segments, are assignable to a respective solid angle segment,
wherein the emitter unit is configured for operation such that, for each of at least some solid angle segments, at least two of the emitters are configured to emit their pulses sequentially relative to each other, at least temporarily, and
wherein the emitter unit is configured for operation such that, for each of the at least two emitters, two directly consecutive pulses are separated by a pause period of not more than 10 µs.

2. The distance measurement unit as claimed in claim 1, wherein the receiver unit is configured to assign echo pulses from different solid angle segments at the same time to the respective solid angle segments.

3. The distance measurement unit as claimed in claim 2, wherein the receiver unit comprises a lens and a planar sensor with a sensitive sensor surface for spatially resolved reception, wherein via the lens each of the solid angle segments is assigned a separate region of the sensor surface so that the echo pulses from the different solid angle segments are directed onto different regions of the sensor surface.

4. The distance measurement unit as claimed in claim 2, wherein at least one of the emitters is configured to emit a respective pulse into all solid angle segments simultaneously.

5. The distance measurement unit as claimed in claim 2, wherein at least one of the emitters is configured to emit a respective pulse into a plurality of, but not all, solid angle segments simultaneously.

6. The distance measurement unit as claimed in claim 1, wherein the emitter unit is configured to emit the pulses sequentially into the individual solid angle segments.

7. The distance measurement unit as claimed in claim 6, wherein the receiver unit comprises a sensor with a sensitive sensor surface, wherein an entire detection field is assigned to the sensor surface, and wherein the electromagnetic radiation incident on the sensor surface is detected integrally.

8. The distance measurement unit as claimed in claim 1, wherein the pulses, which are emitted at least temporarily sequentially, comprise an encoding.

9. The distance measurement unit as claimed in claim 1, wherein the at least two emitters, which are configured to emit their pulses sequentially relative to each other at least temporarily, emit their pulses sequentially in a first operating mode and emit their pulses simultaneously in a second operating mode.

10. The distance measurement unit as claimed in claim 1, wherein at least one of the emitters is configured to emit its pulses over time at a different power, the power being adjusted depending on a classification of the object.

11. The distance measurement unit as claimed in claim 10, wherein at least one of the emitters is configured to emit its pulses at a first distance d1 from the object with a first power P1 and at a second distance d2 from the object with a second power P2, where d1<d2 and P1<P2.

12. A method for operating the distance measurement unit as claimed in claim 1, in which the distance from the object is measured based on a signal propagation time, for which the emitters emit their respective pulses and the receiver unit is used to measure the distance-dependent propagation time, wherein at least two of the emitters emit into at least some of the solid angle segments.

13. A distance measurement unit for signal propagation time-based measurement of a distance from an object located in a detection field, wherein the detection field is segmented into different solid angle segments, the distance measurement unit comprising:
an emitter unit comprising a plurality of emitters, each emitter configured to emit pulses in form of electromagnetic radiation; and
a receiver unit configured to receive echo pulses,
wherein the distance measurement unit is configured to measure the echo pulses from the different solid angle segments,
wherein, for at least some solid angle segments of the solid angle segments, at least two emitters are assigned to a single solid angle segment and are configured to emit pulses into the single solid angle segment, and
wherein each of the at least two emitters is configured to emit pulses sequentially relative to each other with a pause period of not more than 10 µs between two directly consecutive pulses.

14. The distance measurement unit as claimed in claim 13, wherein the receiver unit comprises a lens and a planar sensor with a sensitive sensor surface for spatially resolved reception, and wherein, via the lens, each of the single solid-angle segments is assigned a separate region of the sensor surface so that the echo pulses from the different solid angle segments are directed onto different regions of the sensor surface.

15. The distance measurement unit as claimed in claim 13, wherein the receiver unit comprises a sensor with a sensitive sensor surface, wherein an entire detection field is assigned to the sensor surface, and wherein the echo pulses incident on the sensor surface are detected integrally.

16. The distance measurement unit as claimed in claim 13, wherein at least one of the emitters is configured to emit pulses over time with a different power, the power being adjusted depending on a classification of the object.

\* \* \* \* \*